United States Patent
Liao et al.

(10) Patent No.: US 8,092,038 B2
(45) Date of Patent: Jan. 10, 2012

(54) LAMP SHADE

(75) Inventors: Wen-Yuan Liao, Taichung (TW); Sheng-Chieh Chao, Jhongli (TW); Jui-Chuan Chien, Jhonge (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 239 days.

(21) Appl. No.: 12/397,778

(22) Filed: Mar. 4, 2009

(65) Prior Publication Data
US 2010/0226125 A1 Sep. 9, 2010

(51) Int. Cl.
*F21V 21/14* (2006.01)
(52) U.S. Cl. ......... 362/217.1; 362/217.12; 362/217.16; 362/249.01; 362/249.02
(58) Field of Classification Search .......... 362/606, 362/608, 612, 613, 611, 249.11, 217.01, 362/217.12, 217.14, 217.16, 655, 656, 227, 362/249.01, 217.1, 372, 362, 632–634, 249.02
See application file for complete search history.

(56) References Cited

U.S. PATENT DOCUMENTS

| | | | | |
|---|---|---|---|---|
| 5,045,981 A | * | 9/1991 | Nagano | 362/219 |
| 5,365,411 A | * | 11/1994 | Rycroft et al. | 362/20 |
| 7,207,710 B2 | * | 4/2007 | Kim | 362/634 |
| 7,674,010 B2 | * | 3/2010 | Griffiths et al. | 362/249.02 |
| 2008/0106892 A1 | * | 5/2008 | Griffiths et al. | 362/223 |
| 2008/0219002 A1 | * | 9/2008 | Sommers et al. | 362/247 |

* cited by examiner

*Primary Examiner* — Robert May
*Assistant Examiner* — Leah S Lovell
(74) *Attorney, Agent, or Firm* — Morris Manning & Martin LLP; Tim Tingkang Xia, Esq.

(57) ABSTRACT

A lamp shade includes a frame bar and a plurality of fixing members. The frame bar includes a pair of wall bodies and a base connected between the wall bodies. Each wall body has an inner wall surface, and the inner wall surfaces are disposed facing each other. The fixing members are disposed at the wall bodies, and at least one fixing member is located on each inner wall surface.

18 Claims, 9 Drawing Sheets

LAMP SHADE

BACKGROUND OF THE INVENTION

1. Field of invention

The present invention relates to a lamp shade, and more particularly to a lamp shade applicable to a liquid crystal display (LCD).

2. Related Art

Currently, in the technical field of liquid crystal displays (LCDs), an edge-type backlight module generally uses light-emitting diodes (LEDs) as a light source. In particular, the above edge-type backlight module includes a lamp shade and a light bar. The light bar includes a plurality of LEDs and a circuit board, and the LEDs are disposed on the circuit board.

The light bar is accommodated in the lamp shade and assembled to the lamp shade. The light bar is mostly assembled to the lamp shade in an adhering manner. In particular, firstly, a surface of the circuit board in the light bar is coated with a layer of resin or glue, or adhered with a layer of double-sided tape. Afterwards, the circuit board is adhered into the lamp shade by the resin, glue, or double-sided tape. Thus, the light bar is assembled into the lamp shade.

SUMMARY OF THE INVENTION

Accordingly, the present invention provides a lamp shade which is utilized to accommodate the light-emitting element.

Accordingly, the present invention provides a lamp shade. The lamp shade includes a frame bar and a plurality of fixing members. The frame bar includes a pair of wall bodies and a base connected between the wall bodies. Each wall body has an inner wall surface, and the inner wall surfaces are disposed facing each other. The fixing members are disposed at the wall bodies, and at least one fixing member is located on each inner wall surface.

In one embodiment, the fixing members are elastically connected to the wall bodies.

In one embodiment, each of the fixing members is a mounting plate.

In one embodiment, the fixing members all extend from the wall bodies towards the base.

In one embodiment, each of the fixing members has a connecting end and a distal end opposite to the connecting end, the connecting ends are connected to the wall bodies, the distal ends neither contact the wall bodies nor contact the base, and a distance between the distal ends and the base is smaller than a distance between the connecting ends and the base.

In one embodiment, at least one fixing member further has a bending portion configured between the connecting end and the distal end thereof, such that the fixing member bends towards the wall body where the fixing member is disposed.

In one embodiment, the length from the bending portion to the connecting end of the fixing member is greater than the length from the bending portion to the distal end of the fixing member.

In one embodiment, the length from the bending portion to the connecting end of the fixing member is smaller than the length from the bending portion to the distal end of the fixing member.

In one embodiment, the lamp shade is capable of accommodating a light-emitting element and the light-emitting element is disposed between the wall bodies and located on a bottom surface of the base.

In one embodiment, the light-emitting element is a light bar, and the light bar includes a circuit board and at least one light-emitting diode (LED) assembled on the circuit board.

In one embodiment, the circuit board is disposed between the distal ends and the bottom surface of the base.

In one embodiment, the lamp shade is capable of being assembled with a light source module body to form a light source module.

In one embodiment, the light source module is an edge-type backlight module.

In one embodiment, one fixing member located on one inner wall surface and one fixing member located on the other inner wall surface are disposed facing each other.

In one embodiment, all fixing members located on one inner wall surface and all fixing members located on the other inner wall surface are respectively disposed facing each other.

In one embodiment, all fixing members located on one inner wall surface and all fixing members located on the other inner wall surface are distributed in a staggered manner.

In one embodiment, at least one baffle plate disposed at the base and located between the wall bodies is included.

In one embodiment, a pair of baffle plates disposed at the base and located between the wall bodies is included, wherein the baffle plates are respectively located at two opposite ends of the frame bar.

In one embodiment, the base has at least one opening, and the baffle plate is located beside the opening.

In one embodiment, at least one wall body has at least one opening, and the opening exposes one fixing member.

In one embodiment, each of the wall bodies has a plurality of openings, and the openings expose the fixing members.

By means of the fixing member, the light-emitting element cannot easily drop out from the lamp shade such that the light-emitting element can be assembled to the lamp shade.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1A:
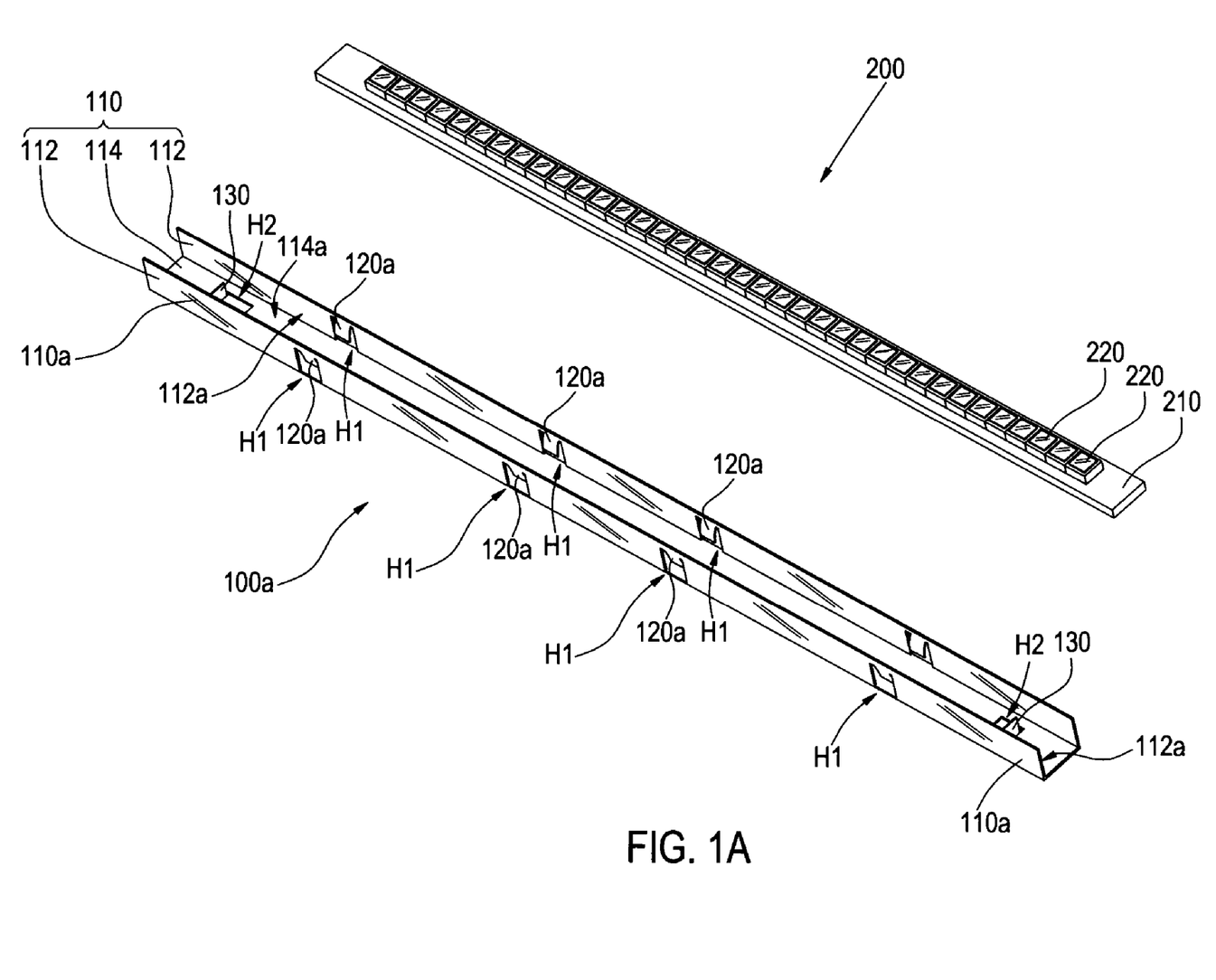
FIG. 1A is a three-dimensional schematic view of a lamp shade and a light-emitting element according to one embodiment of the present invention before assembling.
Figure 1B:
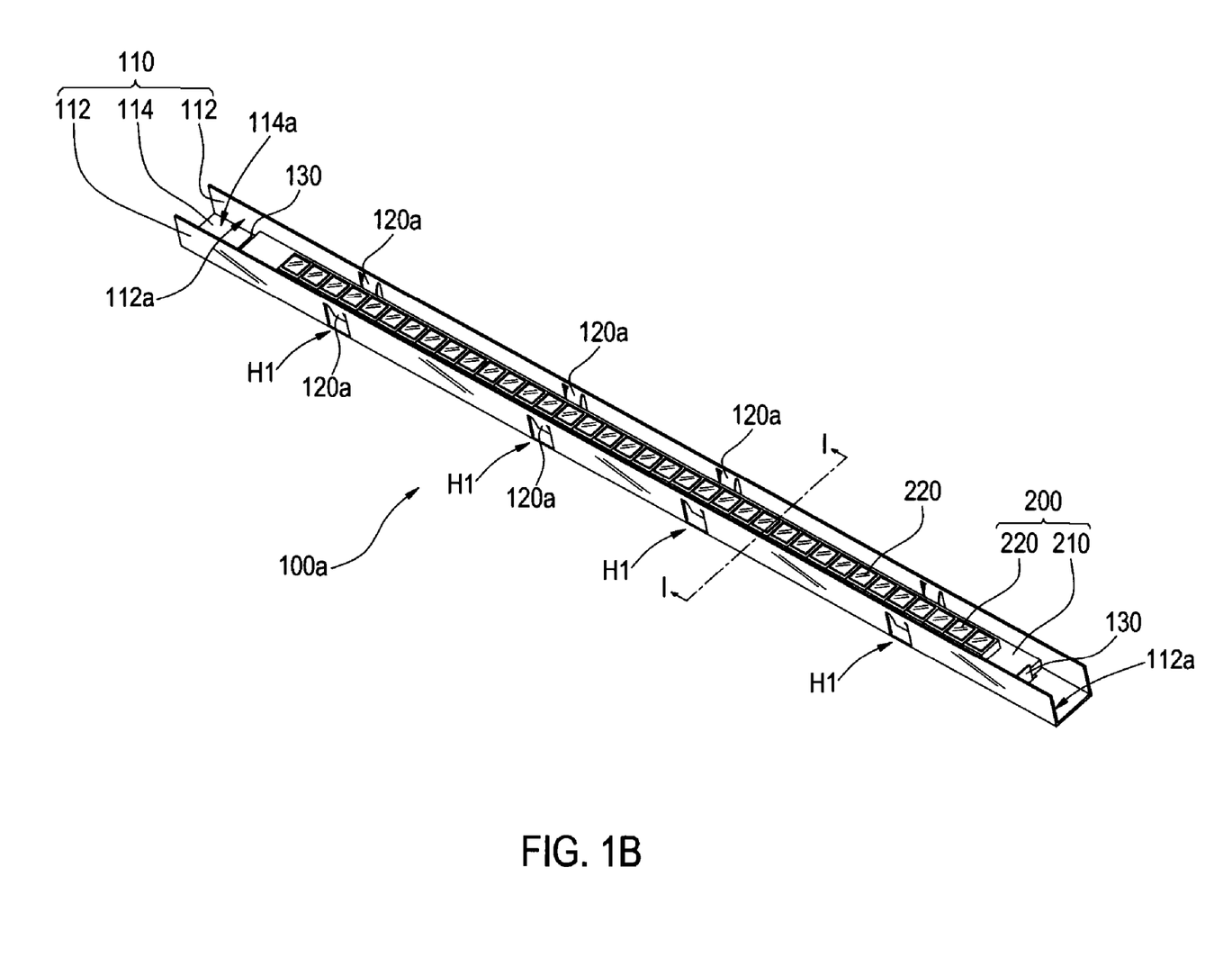
FIG. 1B is a three-dimensional schematic view of the lamp shade and the light-emitting element in FIG. 1A after being assembled together.

FIG. 1A is a three-dimensional schematic view of a lamp shade and a light-emitting element according to one embodiment of the present invention before assembling, and FIG. 1B is a three-dimensional schematic view of the lamp shade and the light-emitting element in FIG. 1A after being assembled together. Referring to FIGS. 1A and 1B, a lamp shade 100a includes a frame bar 110 and a plurality of fixing members 120a. The frame bar 110 includes a pair of wall bodies 112 and a base 114, and the base 114 is connected between the wall bodies 112 and has a bottom surface 114a. Each wall body 112 has an inner wall surface 112a, and the inner wall surfaces 112a are disposed facing each other.

The fixing members 120a are disposed at the wall bodies 112, and at least one fixing member 120a is located on each inner wall surface 112a. That is to say, one or more fixing members 120a are disposed on each inner wall surface 112a. Each fixing member 120a protrudes from the inner wall surface 112a where the fixing member 120a is located, and each fixing member 120a may be a tabular body. In other words, the fixing members 120a may be of a plate shape.

The lamp shade 100a is capable of accommodating a light-emitting element 200, and the light-emitting element 200 is disposed between the wall bodies 112 and located on the bottom surface 114a, as shown in FIG. 1B. The light-emitting element 200 may be a light bar including a circuit board 210 and at least one light-emitting diode (LED) 220. The LEDs 220 are assembled on the circuit board 210. Each LED 220 may emit white light. Definitely, the LEDs 220 may also respectively emit red light, blue light, and green light, so as to generate white light by mixing up the color lights.

In one embodiment, each wall body 112 has a plurality of openings H1. One opening H1 exposes one fixing member 120a, and the openings H1 expose the fixing members 120a. For example, the fixing members 120a may be formed by a punching process. Therefore, the fixing members 120a and the frame bar 110 may be formed integrally, and the openings H1 are formed by the above punching process. Definitely, the fixing members 120a may be formed through various different manners, and the punching process is merely one of the manners for forming the fixing members 120a, which is not intended to limit the present invention.

Although the wall bodies 112 as shown in FIGS. 1A and 1B all have a plurality of openings H1, in other embodiments that are not depicted, the wall bodies 112 may have merely one opening H1, or only one wall body 112 has openings H1 whereas the other wall body 112 has no openings H1. Therefore, the number and distribution of the openings H1 as shown in FIGS. 1A and 1B are described for demonstrations only, and are not intended to limit the present invention.

In one embodiment, one fixing member 120a located on one inner wall surface 112a and one fixing member 120a located on the other inner wall surface 112a are disposed facing each other, and as shown in FIGS. 1A and 1B, all fixing members 120a located on one inner wall surface 112a and all fixing members 120a located on the other inner wall surface 112a are respectively disposed facing each other. That is to say, all fixing members 120a located on one inner wall surface 112a and all fixing members 120a located on the other inner wall surface 112a are distributed symmetrically with respect to each other, as shown in FIG. 1A.

However, in other embodiments, the fixing members 120a may not be symmetrically distributed. In particular, referring to FIG. 1C, a lamp shade 100b includes the fixing members 120a and a frame bar 110'. The frame bar 110' includes a pair of wall bodies 112'. At least one fixing member 120a is located on an inner wall surface 112a' of each wall body 112', and all fixing members 120a located on one inner wall surface 112a' and all fixing members 120a located on the other inner wall surface 112a' are distributed in a staggered manner.

Figure 1C:
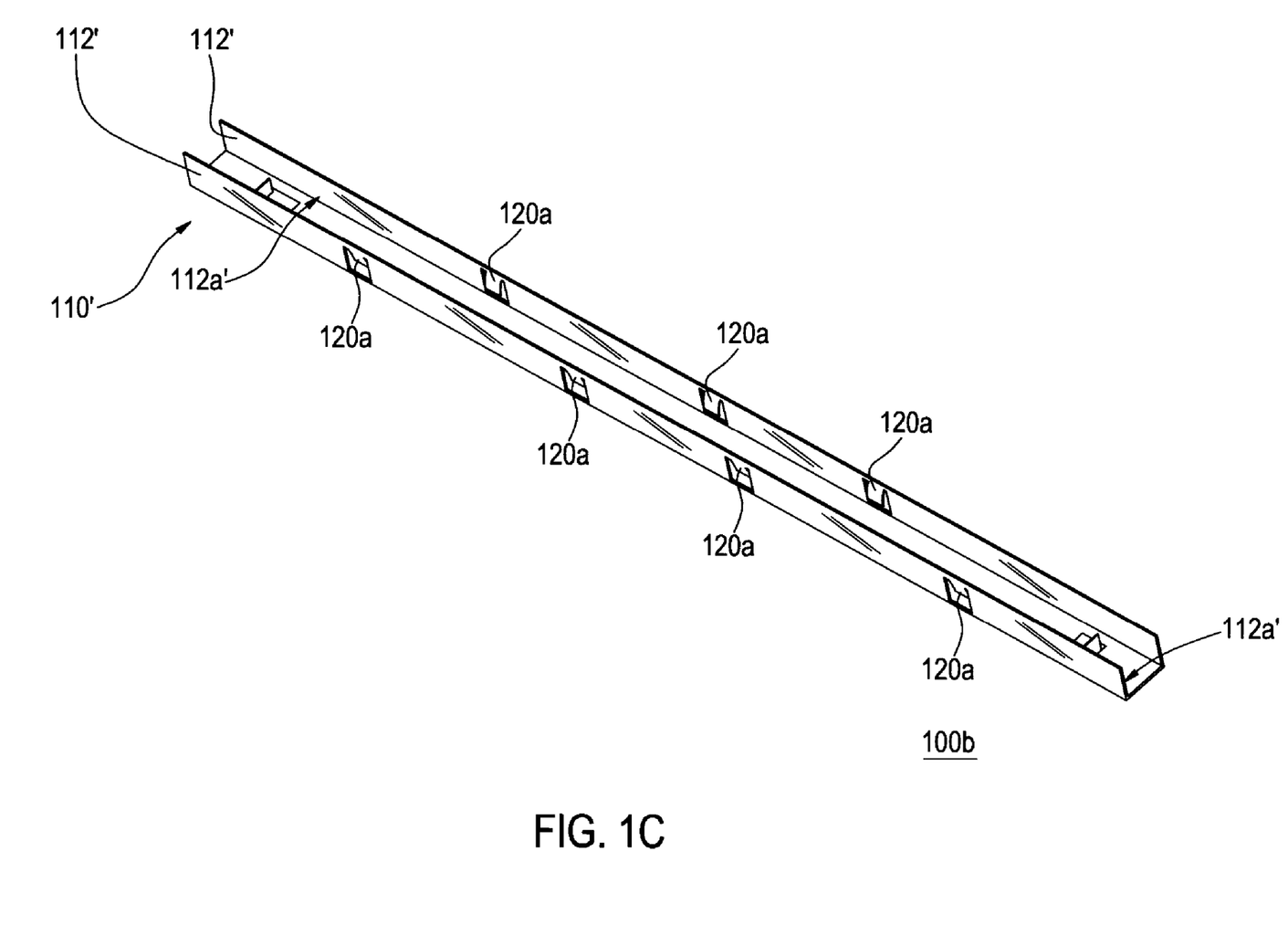
FIG. 1C is a three-dimensional schematic view of a lamp shade according to one embodiment of the present invention.

In particular, the fixing members 120a located on one inner wall surface 112a' all face the other inner wall surface 112a' on an opposite side thereof. That is to say, one fixing member 120a located on one inner wall surface 112a' and one fixing member 120a located on the other inner wall surface 112a' are not disposed face to face, such that the fixing members 120a are distributed in a staggered manner, as shown in FIG. 1C.

Figure 2:
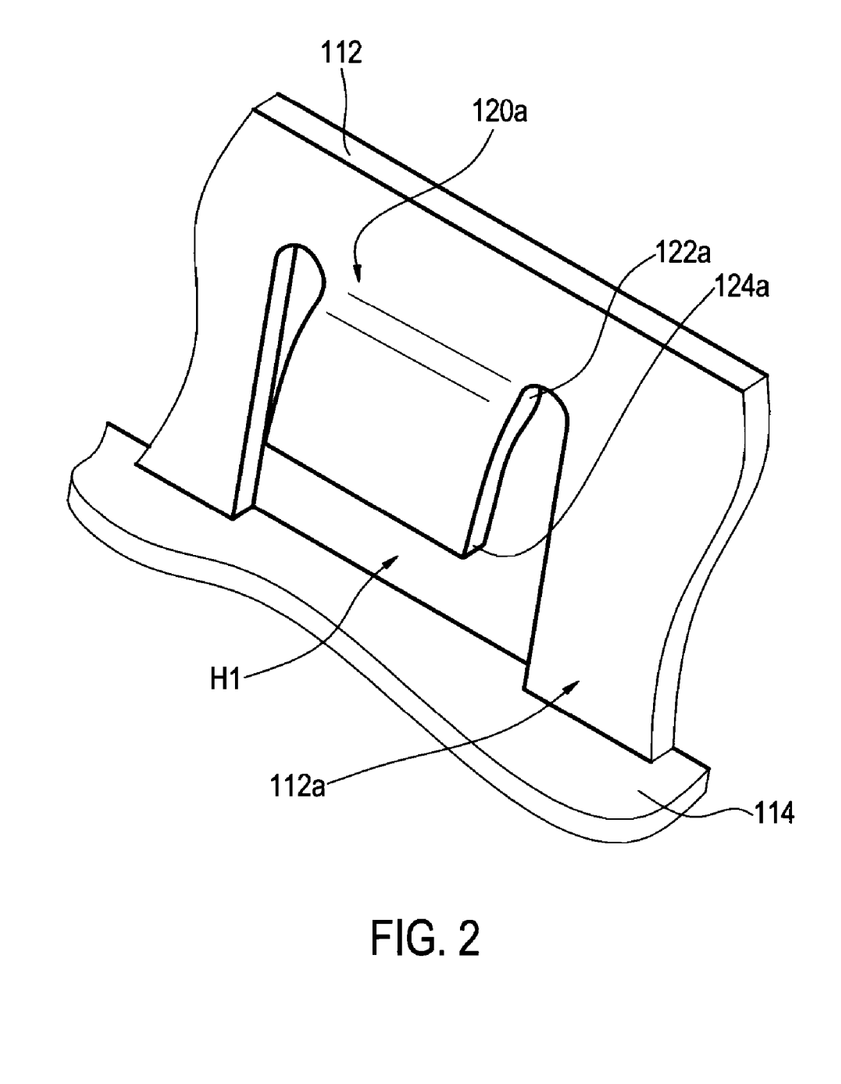
FIG. 2 is a schematic partially enlarged view of the lamp shade in FIG. 1A, partially enlarged at a position of a fixing member thereof.

FIG. 2 is a schematic partially enlarged view of the lamp shade in FIG. 1A, partially enlarged at a position of a fixing member thereof. Referring to FIGS. 1A and 2, all the fixing members 120a of this embodiment extend from the wall bodies 112 towards the base 114. In particular, each fixing member 120a has a connecting end 122a and a distal end 124a opposite to the connecting end 122a.

Furthermore, the connecting ends 122a are connected to the wall bodies 112, and the distal ends 124a neither contact the wall bodies 112 nor contact the base 114. The distance between the distal ends 124a and the base 114 is smaller than the distance between the connecting ends 122a and the base 114. That is to say, the distal ends 124a are much closer to the base 144 than the connecting ends 122a.

Figure 3A:
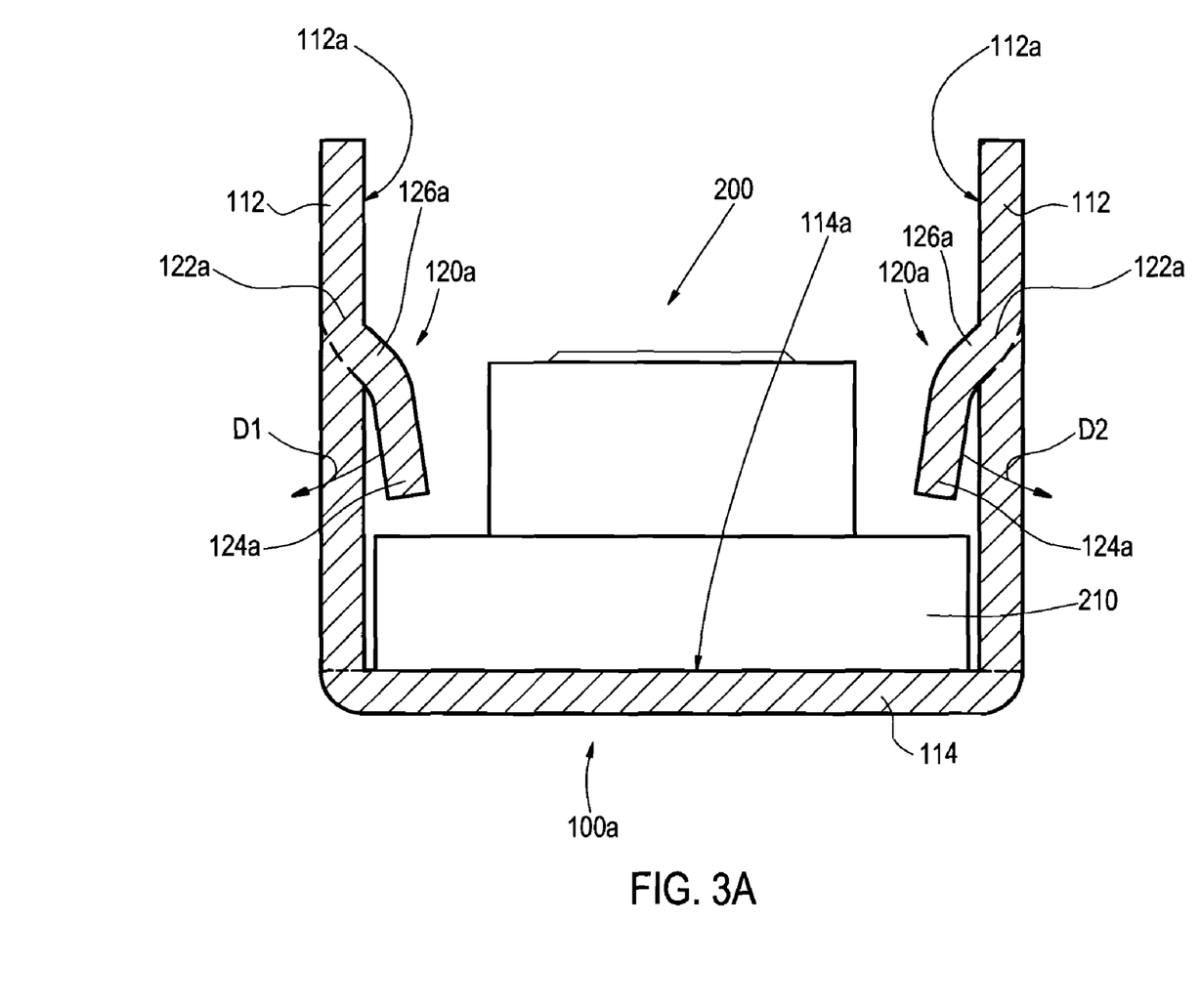
FIG. 3A is a schematic cross-sectional view of FIG. 1B taken along a line I-I.

FIG. 3A is a schematic cross-sectional view of FIG. 1B taken along a line I-I. Referring to FIG. 3A, when the light-emitting element 200 is disposed between the wall bodies 112 and located on the bottom surface 114a, the circuit board 210 is disposed between the distal ends 124a and the bottom surface 114a. The distal ends 124a can restrict the movement of the light-emitting element 200, such that the light-emitting element 200 cannot easily drop out from the lamp shade 100a. Moreover, the fixing members 120a may be designed to have a longer length, such that the distal ends 124a can press against the circuit board 210 of the light-emitting element 200. Thus, the light-emitting element 200 can be stably assembled into the lamp shade 100a.

Furthermore, the fixing members 120a are elastically connected to the wall bodies 112. Therefore, when the light-emitting element 200 needs to pass through the wall bodies 112 to be accommodated into the lamp shade 100a, the fixing members 120a are pressed by the circuit board 210 and respectively move towards the directions D1 and D2, thereby enabling the circuit board 210 to reach the bottom surface 114a of the base 114.

Once the circuit board 210 passes through the fixing members 120a and the fixing members 120a are no longer pressed, the fixing members 120a are driven by the restoring forces to move towards the directions opposite to the directions D1 and D2, such that the fixing members 120a substantially return to the original positions. Thus, the circuit board 210 is disposed between the distal ends 124a and the bottom surface 114a.

In one embodiment, each fixing member 120a further has a bending portion 126a configured between the connecting end 122a and the distal end 124a thereof. Through the bending portion 126a, each fixing member 120a bends towards the wall body 112 where the fixing member 120a is located, as shown in FIG. 3A. Moreover, as for the same fixing member 120a, the length from the bending portion 126a to the connecting end 122a of the fixing member 120a may be smaller than the length from the bending portion 126a to the distal end 124a of the fixing member 120a. In other words, the bending portion 126a may be much closer to the connecting end 122a.

Figure 3B:
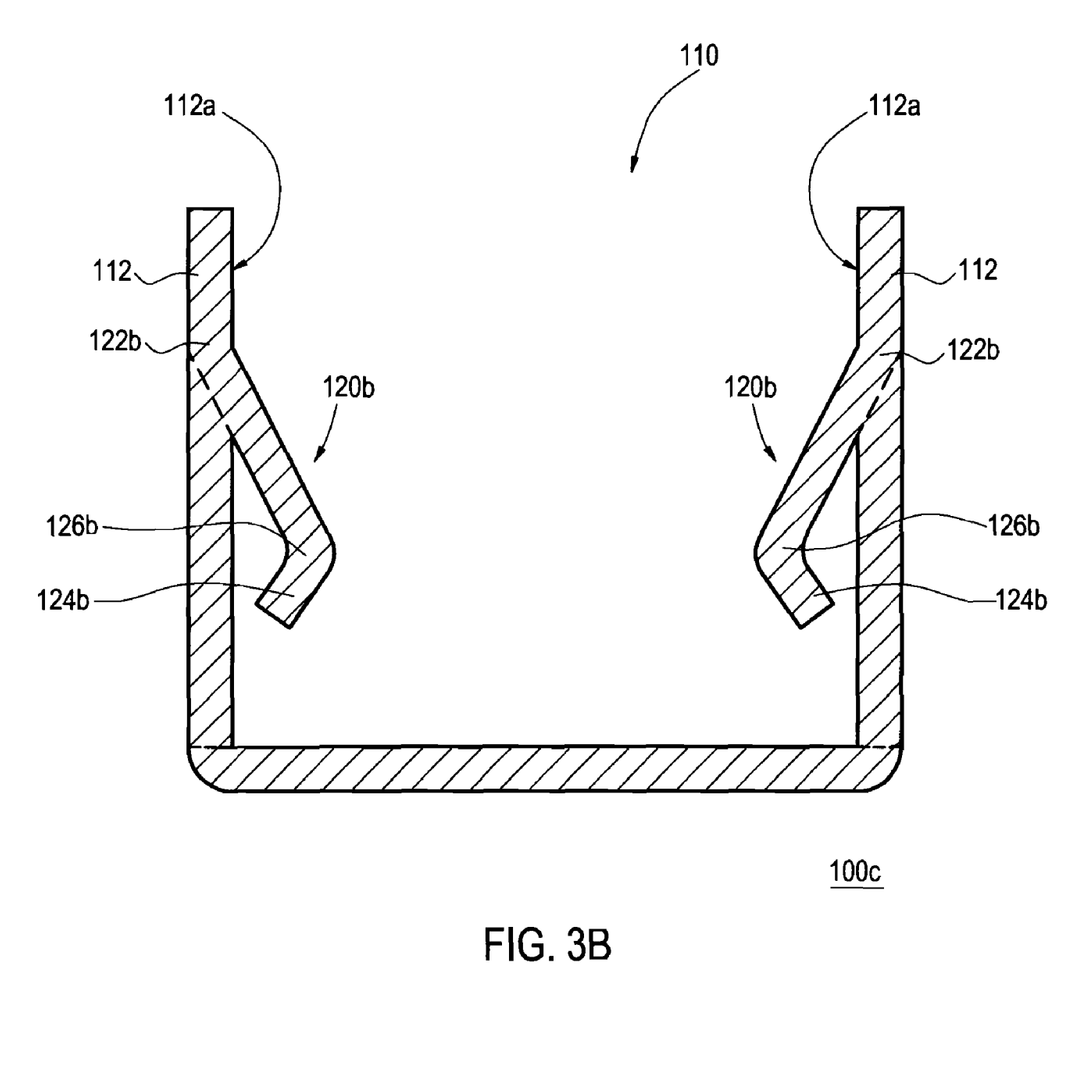
FIG. 3B is a schematic cross-sectional view of a lamp shade according to one embodiment of the present invention.

However, in other embodiments, the bending portion 126a may be closer to the distal end 124a, instead of being closer to the connecting end 122a, as shown in FIG. 3B. Referring to FIG. 3B, a lamp shade 100c includes the frame bar 110 and a plurality of fixing members 120b. The fixing members 120b are disposed at the wall bodies 112, and at least one fixing member 120b is located on each inner wall surface 112a.

Each fixing member 120b has a connecting end 122b connected to the wall body 112, a distal end 124b opposite to the connecting end 122b, and a bending portion 126b configured between the connecting end 122b and the distal end 124b. As for the same fixing member 120b, the length from the bending portion 126b to the connecting end 122b of the fixing member 120b may be greater than the length from the bending portion 126b to the distal end 124b of the fixing member 120b. In other words, the bending portion 126b is much closer to the distal end 124b.

It should be noted that, the bending portions 126a and 126b are optional structures rather than necessary structures for the fixing members 120a and 120b. That is to say, the fixing member 120a or 120b may have neither the bending portion 126a nor the bending portion 126b, as shown in FIG. 3C.

Figure 3C:
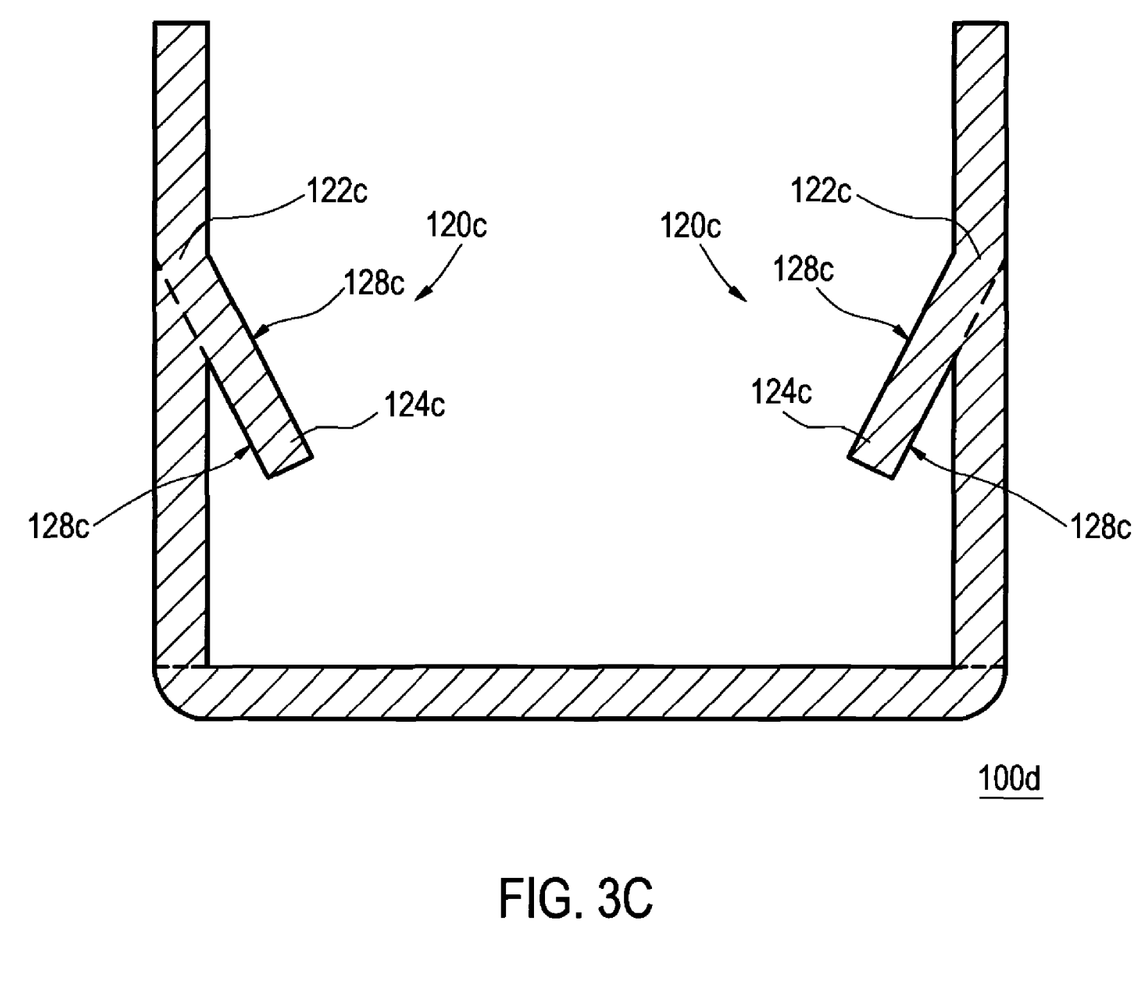
FIG. 3C is a three-dimensional schematic view of a lamp shade according to one embodiment of the present invention.

Referring to FIG. 3C, a lamp shade 100d includes a plurality of fixing members 120c. Each fixing member 120c has a connecting end 122c and a distal end 124c, and does not have any bending portion. The connecting end 122c is opposite to the distal end 124c in position. In other words, the fixing members 120c of the lamp shade 100d are substantially of a plate shape, that is, each fixing member 120c has two opposite surfaces 128c.

It should be particularly noted that, all fixing members included in the lamp shade of the embodiment may not have exactly the same structure, and may even have different structures. For example, in other embodiments that are not depicted, the same lamp shade may include a plurality of fixing members 120a, 120b, or 120c, or any combination of the fixing members 120a, 120b, and 120c. In other words, the above lamp shade 100a, 100b, 100c, or 100d may optionally select to use any of the fixing members 120a, 120b, and 120c. Therefore, the lamp shades 100a to 100d as shown in FIGS. 1A to 1C and FIGS. 3A to 3C are described for demonstrations only, and are not intended to limit the present invention.

Figure 4:
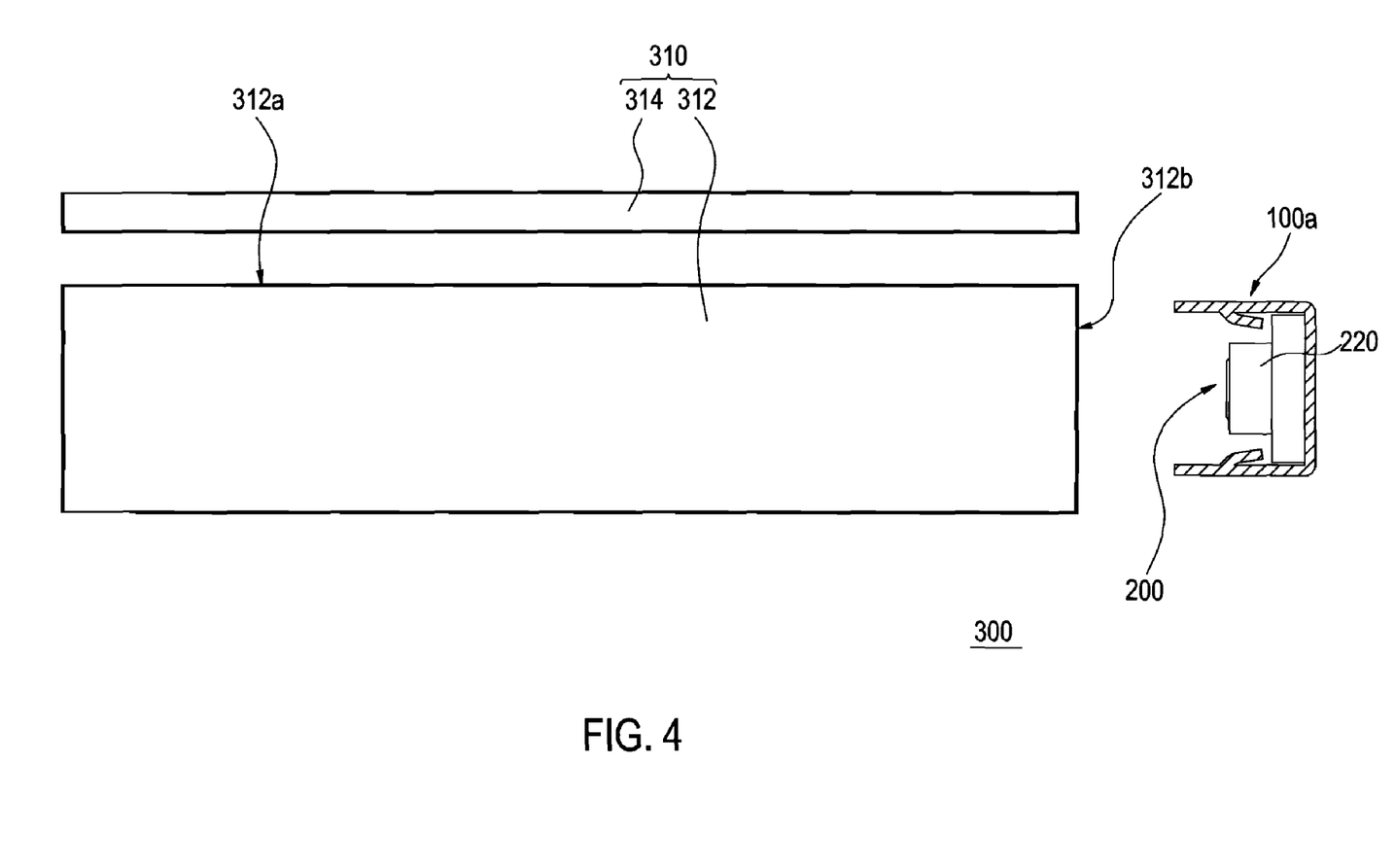
FIG. 4 is a schematic cross-sectional view of a light source module including the lamp shade in FIG. 3A.

FIG. 4 is a schematic cross-sectional view of a light source module including the lamp shade in FIG. 3A. Referring to FIG. 4, after the light-emitting element 200 is accommodated into the lamp shade 100a, the lamp shade 100a may be further assembled with a light source module body 310 to form a light source module 300. The light source module 300 may be a backlight module.

In particular, the light source module body 310 may include a light guide plate 312 and at least one optical film 314. The light guide plate 312 has a light emitting surface 312a and a light incident surface 312b connected to the light emitting surface 312a. The optical film 314 is disposed on the light emitting surface 312a. The lamp shade 100a and the light-emitting element 200 are both disposed adjacent to the light incident surface 312b. The LEDs 220 of the light-emitting element 200 emit lights towards the light incident surface 312b.

The lights enter the light guide plate 312 via the light incident surface 312b, and then the lights are scattered and reflected within the light guide plate 312, and then emitted from the light emitting surface 312a. Afterwards, the lights pass through the optical film 314 and are homogenized by the optical film 314. Thus, the light source module 300 provides a surface light source with uniform brightness distribution, which thus is applicable to a liquid crystal display (LCD). As known from the above introductions about the light source module body 310, the light source module 300 is actually an edge-type backlight module.

Figure 5:
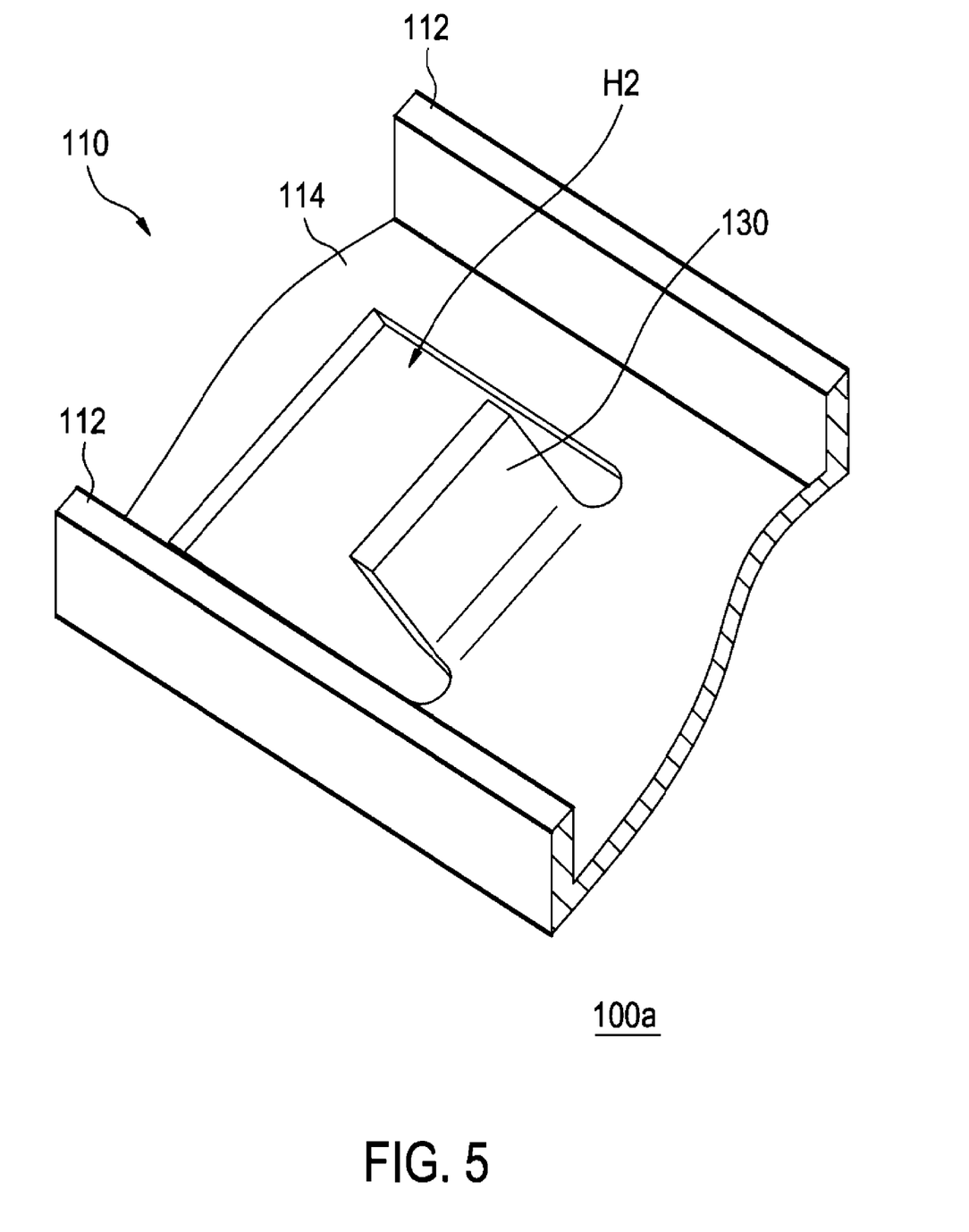
FIG. 5 is a schematic partially enlarged view of the lamp shade in FIG. 1A, partially enlarged at a position of a baffle plate thereof.

FIG. 5 is a schematic partially enlarged view of the lamp shade in FIG. 1A, partially enlarged at a position of a baffle plate thereof. Referring to FIGS. 1A and 5, in this embodiment, the lamp shade 100a further includes a pair of baffle plates 130. However, in other embodiments that are not depicted, the lamp shade 100a may also include only one baffle plate 130.

The baffle plates 130 are disposed at the base 114 and located between the wall bodies 112, and the baffle plates 130 are respectively located at two opposite ends 110a of the frame bar 110. When the light-emitting element 200 is assembled to the lamp shade 100a, the baffle plates 130 restrict the movement of the light-emitting element 200, such that the light-emitting element 200 cannot easily drop out of the lamp shade 100a from any end 110a. Thus, the light-emitting element 200 can be stably assembled within the lamp shade 100a.

In addition, the base 114 may further have one or more openings H2, and the baffle plates 130 are respectively located beside the openings H2. For example, the baffle plates 130 may also be formed by a punching process. Therefore, the baffle plates 130 and the frame bar 110 may be integrally formed. The openings H2 may be formed by the above punching process. However, the baffle plates 130 may be formed by various different manners, and the punching process is merely one of the manners for forming the baffle plates 130, which is not intended to limit the present invention.

To sum up, the lamp shade of the present invention can accommodate a light-emitting element, can be assembled with a light source module body to form a light source module (for example, an edge-type backlight module), and is thus applicable to an LCD. In addition, the fixing members can restrict the movement of the light-emitting element, such that the light-emitting element cannot easily drop out of the lamp shade, and is thus assembled into the lamp shade.

In addition, the fixing members are elastically connected to the wall bodies. Therefore, when the light-emitting element is accommodated into the lamp shade, the fixing members are pressed by the light-emitting element, thereby enabling the light-emitting element to reach the bottom surface of the frame bar. Once the light-emitting element passes through the fixing members and the fixing members are no longer pressed, the fixing members are driven by the restoring forces to substantially return to the original positions. Thus, the circuit board of the light-emitting element is disposed between the distal ends and the bottom surface, such that the fixing members can restrict the movement of the light-emitting element.

Furthermore, the lamp shade of the present invention may further include at least one baffle plate. The baffle plate can restrict the movement of the light-emitting element, such that the light-emitting element cannot easily drop out of the lamp shade from any end of the frame bar. In the present invention, the light-emitting element can be more stably assembled within the lamp shade by using the baffle plate.

Although the present invention is disclosed above through the foregoing embodiments, the embodiments are not intended to limit the present invention. Equivalent variations and modifications made by those skilled in the art without departing from the spirit or scope of the present invention still fall within the scope of the present invention.

What is claimed is:

1. A lamp shade, comprising:
   a frame bar, comprising a first wall body and a second wall body and a base connected between the first and the second wall bodies, wherein each of the wall bodies has an inner wall surface, the inner wall surfaces are disposed facing each other, and the base has a bottom surface and a plurality of first openings in the bottom surface;
   a plurality of fixing members, disposed at the first and the second wall bodies, wherein at least two fixing member are located on each inner wall surface; and
   a pair of baffle plates, disposed on the bottom surface and located between the first and the second wall bodies, wherein the baffle plates protrudes from the bottom surface and respectively located at two opposite ends of the frame bar, the baffle plates are located beside the first openings;
   wherein the fixing members, the baffle plates, and the frame bar are formed integrally.

2. The lamp shade according to claim 1, wherein the fixing members are elastically connected to the first and the second wall bodies.

3. The lamp shade according to claim 1, wherein each of the fixing members is a tabular body.

4. The lamp shade according to claim 1, wherein the fixing members all extend from the first and the second wall bodies towards the base.

5. The lamp shade according to claim 1, wherein each of the fixing members has a connecting end and a distal end opposite to the connecting end, the connecting ends are connected to the first and the second wall bodies, the distal ends neither contact the first and the second wall bodies nor contact the base, and a distance between the distal ends and the base is smaller than a distance between the connecting ends and the base.

6. The lamp shade according to claim 5, wherein at least one fixing member further has a bending portion configured between the connecting end and the distal end thereof, such that the fixing member bends towards the first and the second wall body where the fixing member is disposed.

7. The lamp shade according to claim 6, wherein a length from the bending portion to the connecting end of the fixing member is greater than a length from the bending portion to the distal end of the fixing member.

8. The lamp shade according to claim 6, wherein a length from the bending portion to the connecting end of the fixing member is smaller than a length from the bending portion to the distal end of the fixing member.

9. The lamp shade according to claim 5, wherein the lamp shade is capable of accommodating a light-emitting element and the light-emitting element is disposed between the wall bodies and located on the bottom surface.

10. The lamp shade according to claim 9, wherein the light-emitting element is a light bar, and the light bar comprises a circuit board and at least one light-emitting diode (LED) assembled on the circuit board.

11. The lamp shade according to claim 10, wherein the circuit board is disposed between the distal ends and the bottom surface of the base.

12. The lamp shade according to claim 9, wherein the lamp shade is capable of being assembled with a light source module body to form a light source module.

13. The lamp shade according to claim 12, wherein the light source module is an edge-type backlight module.

14. The lamp shade according to claim 1, wherein one fixing member located on the inner wall surface of the first wall body and one fixing member located on the inner wall surface of the second wall body are disposed facing each other.

15. The lamp shade according to claim 14, wherein all fixing members located on the inner wall surface of the first wall body and all fixing members located on the inner wall surface of the second wall body are respectively disposed facing each other.

16. The lamp shade according to claim 1, wherein all fixing members located on the inner wall surface of the first wall body and all fixing members located on the inner wall surface of the second are distributed in a staggered manner.

17. The lamp shade according to claim 1, wherein at least one wall body has at least one second opening, and the second opening exposes one fixing member.

18. The lamp shade according to claim 17, wherein each of the wall bodies has a plurality of second openings, and the second openings expose the fixing members.

* * * * *